US012630303B2

(12) United States Patent

Hill, IV

(10) Patent No.: US 12,630,303 B2

(45) Date of Patent: May 19, 2026

(54) MULTI-PART HINGE LINE LOCATION TOOL

(71) Applicant: The Boeing Company, Arlington, VA (US)

(72) Inventor: Chester James Hill, IV, Grafton, IL (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/750,419

(22) Filed: Jun. 21, 2024

(65) Prior Publication Data

US 2025/0388336 A1 Dec. 25, 2025

(51) Int. Cl.
B64F 5/10 (2017.01)

(52) U.S. Cl.
CPC ...................................... B64F 5/10 (2017.01)

(58) Field of Classification Search
CPC ....................................................... B64F 5/10
See application file for complete search history.

(56) References Cited

FOREIGN PATENT DOCUMENTS

WO WO-2025023838 A1 * 1/2025 .......... E04F 21/0023

* cited by examiner

*Primary Examiner* — Moshe Wilensky

(74) *Attorney, Agent, or Firm* — Yee & Associates, P.C.

(57) ABSTRACT

Systems, apparatuses, and methods provide for a tool to support components on a common hinge line axis. The tool includes a first pin and a second pin coupled in coaxial alignment with each other, defining the common hinge line axis. A first shouldered hinge pin is slidably disposed on the first pin and a second shouldered hinge pin is slidably disposed on the second pin. The first and second shouldered hinge pins allow translation along the common hinge line axis of the supported components when coupled to the first and second shouldered hinge pins. The first and second pins are disposed within a ball and socket joint, which enables pivotal adjustment of the common hinge line axis while maintaining the first and second pins co-axial to each other during adjustment of the common hinge line axis, to aid fit and assembly of the supported components to a mating structure.

16 Claims, 8 Drawing Sheets

700

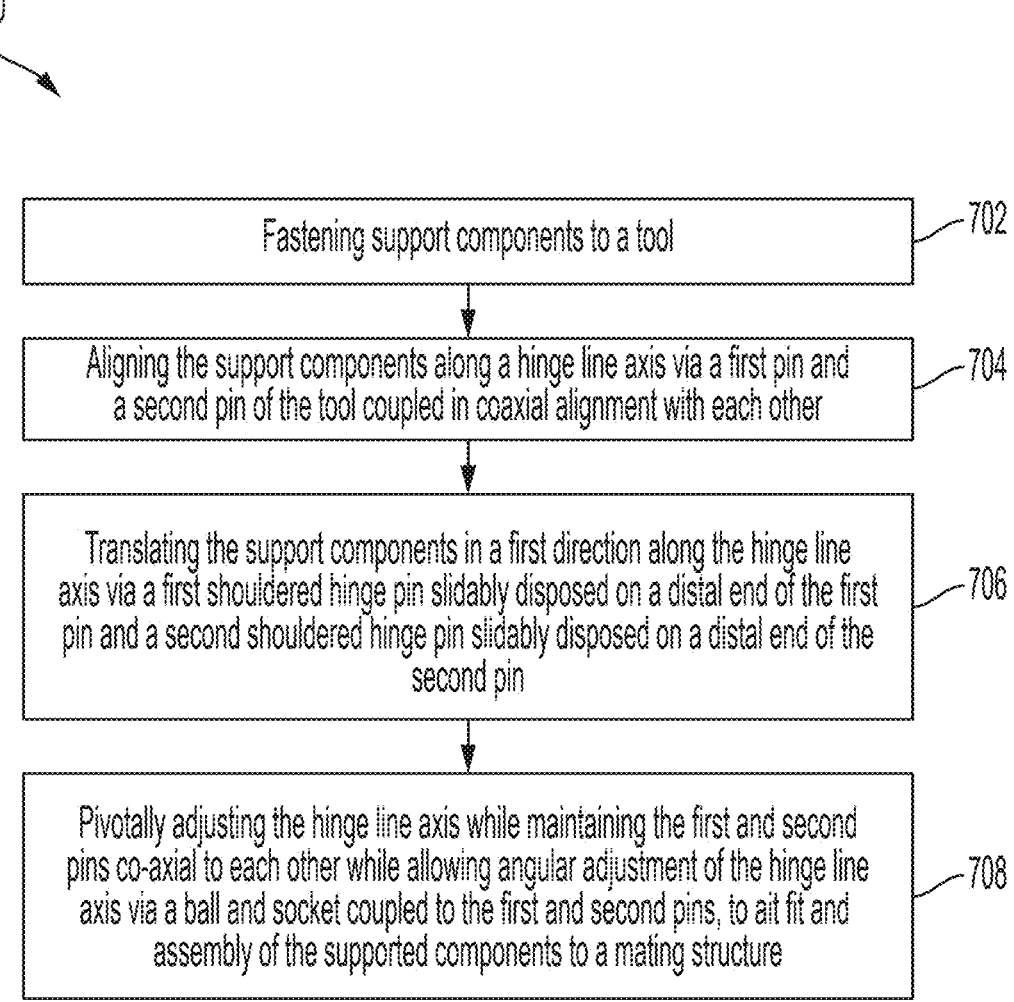

Fastening support components to a tool — 702

Aligning the support components along a hinge line axis via a first pin and a second pin of the tool coupled in coaxial alignment with each other — 704

Translating the support components in a first direction along the hinge line axis via a first shouldered hinge pin slidably disposed on a distal end of the first pin and a second shouldered hinge pin slidably disposed on a distal end of the second pin — 706

Pivotally adjusting the hinge line axis while maintaining the first and second pins co-axial to each other while allowing angular adjustment of the hinge line axis via a ball and socket coupled to the first and second pins, to ait fit and assembly of the supported components to a mating structure — 708

FIG. 7

800

Locking and maintaining the ball and socket joint at a fixed nominal position of the tool when a retaining lock coupled to either the first pin or the second pin is tightened — 802

FIG. 8

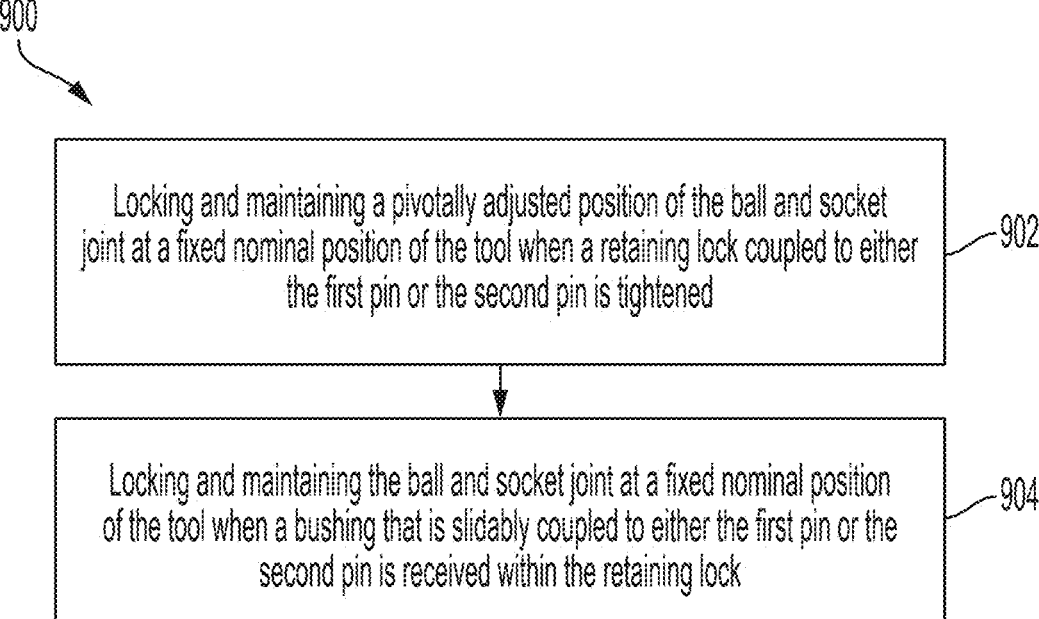

900

Locking and maintaining a pivotally adjusted position of the ball and socket joint at a fixed nominal position of the tool when a retaining lock coupled to either the first pin or the second pin is tightened — 902

Locking and maintaining the ball and socket joint at a fixed nominal position of the tool when a bushing that is slidably coupled to either the first pin or the second pin is received within the retaining lock — 904

FIG. 9

MULTI-PART HINGE LINE LOCATION TOOL

TECHNICAL FIELD

The present disclosure generally relates to a multi-part hinge line location tool. More particularly, the present disclosure relates to a multi-part hinge line location tool for use in airplane manufacturing.

BACKGROUND

Determinant Assembly (DA) is a process where numerically controlled (NC) machines fabricate piece part features prior to assembly. These piece part features are NC machined cleanly and accurately so as to line up precisely with mating piece part indexes during assembly. When DA is performed well, no match-drilling is typically needed to be performed on the assembly line. Accordingly, accurate alignment and positioning of such piece part features are important for DA to improve the speed, cost, and quality of assembly operations.

SUMMARY

As described above, accurate alignment and positioning of piece part features are important for DA to avoid the need for match drilling at the time of assembly. However, minor variations in alignment and positioning of piece part features may be particularly problematic when assembling hinge pieces having a common hinge line.

Accordingly, some implementations discussed herein may support Determinate Assembly (DA) when assembling hinge pieces having a common hinge line, which may allow parts to be fabricated complete with all features incorporated in the final designed condition. This in turn may allow assembly to occur without the performance of match-drilling operations on assembly, further eliminating significant labor cost and cycle time from assembly operations, reducing nonconformances, and eliminating a major source of workplace recordable injuries and lost work days. Implementations of the present disclosure have the potential to eliminate one or more temporary assembly operations, with a substantial cost savings.

More specifically, some implementations herein ensure alignment of axis critical components while allowing the components to be assembled to the allowed locational deviation within the mating substructure. Such implementations permit a combined axial adjustment to facilitate the components to mate with substructure, yet hold fixed the axis that is coaxial between the components. For example, such implementations allow for combined axial adjustment of the hinge line components while holding them coaxial and/or allow for span variation between components. Such operations provide the ability to retain the precision required of hinge lines, while allowing the hinge line to freely move to facilitate nominal DA build conditions. Accordingly, such implementations eliminate the need for boring tooling at the time of assembly, reduces touch labor, and ensures product compliance.

As will be described in greater detail below, in some implementations discussed herein, systems, apparatuses, and methods provide for a tool to support components on a common hinge line axis. The tool includes a first pin and a second pin coupled in coaxial alignment with each other, defining the common hinge line axis. A first shouldered hinge pin is slidably disposed on a distal end of the first pin and a second shouldered hinge pin is slidably disposed on a distal end of the second pin. The first and second shouldered hinge pins allow translation along the common hinge line axis of the supported components when coupled to the first and second shouldered hinge pins. The first and second pins are disposed within a ball and socket joint. The ball and socket joint enables pivotal adjustment of the common hinge line axis while maintaining the first and second pins co-axial to each other during adjustment of the common hinge line axis, to aid fit and assembly of the supported components to a mating structure.

In one aspect, a tool to support components on a common hinge line axis includes a first pin and a second pin coupled in coaxial alignment with each other, defining the common hinge line axis. A first shouldered hinge pin is slidably disposed on a distal end of the first pin and a second shouldered hinge pin is slidably disposed on a distal end of the second pin. The first and second shouldered hinge pins allow translation along the common hinge line axis of the supported components when coupled to the first and second shouldered hinge pins. The first and second pins are disposed within a ball and socket joint. The ball and socket joint enables pivotal adjustment of the common hinge line axis while maintaining the first and second pins co-axial to each other during adjustment of the common hinge line axis, to aid fit and assembly of the supported components to a mating structure.

In another aspect, an assembly system to support components of a workpiece on a common hinge line axis includes a jig fixture to support the workpiece and a tool coupled to the jig fixture. The tool includes a first pin and a second pin coupled in coaxial alignment with each other, defining the common hinge line axis. A first shouldered hinge pin is slidably disposed on a distal end of the first pin and a second shouldered hinge pin is slidably disposed on a distal end of the second pin. The first and second shouldered hinge pins allow translation along the common hinge line axis of the supported components when coupled to the first and second shouldered hinge pins. The first and second pins are disposed within a ball and socket joint. The ball and socket joint enables pivotal adjustment of the common hinge line axis while maintaining the first and second pins co-axial to each other during adjustment of the common hinge line axis, to aid fit and assembly of the supported components to a mating structure.

In yet another aspect, a method to support components on a common hinge line axis includes fastening the support components to a tool. The support components are aligned along the common hinge line axis via a first pin and a second pin of the tool coupled in coaxial alignment with each other. The support components are translated in a first direction along the common hinge line axis via a first shouldered hinge pin slidably disposed on a distal end of the first pin and a second shouldered hinge pin slidably disposed on a distal end of the second pin. The common hinge line axis is pivotally adjusted while maintaining the first and second pins co-axial to each other during adjustment of the common hinge line axis via a ball and socket joint coupled to the first and second pins, to aid fit and assembly of the supported components to a mating structure.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

Various examples will be described below by referencing the following drawings, in which:

FIG. 7 is a flowchart illustrating an example method to support components on a common hinge line axis according to an example;

FIG. 8 is a flowchart illustrating another example method to support components on a common hinge line axis according to an example; and FIG. 9 is a flowchart illustrating a further example method to support components on a common hinge line axis according to an example.

DETAILED DESCRIPTION

As described above, in some implementations discussed herein, systems, apparatuses, and methods provide for a tool to support components on a common hinge line axis. The tool includes a first pin and a second pin coupled in coaxial alignment with each other, defining the common hinge line axis. A first shouldered hinge pin is slidably disposed on a distal end of the first pin and a second shouldered hinge pin is slidably disposed on a distal end of the second pin.

Advantageously, the first and second shouldered hinge pins allow translation along the common hinge line axis of the supported components when coupled to the first and second shouldered hinge pins while maintaining proper alignment. The first and second pins are disposed within a ball and socket joint. The ball and socket joint enables pivotal adjustment of the common hinge line axis while maintaining the first and second pins co-axial to each other during adjustment of the common hinge line axis, to aid fit and assembly of the supported components to a mating structure.

Figure 1:
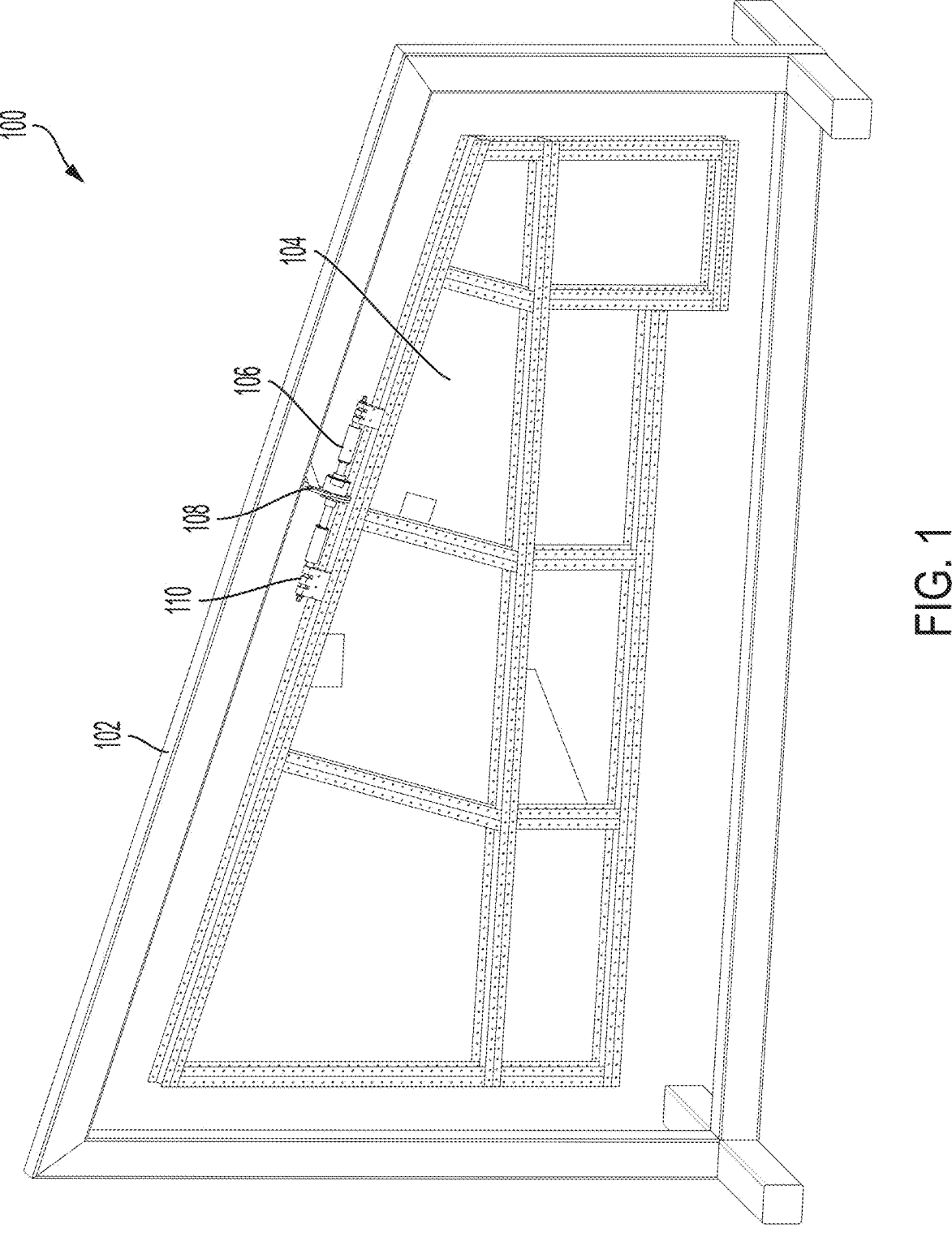
FIG. 1 is a perspective view illustrating an assembly system to support components of a workpiece on a common hinge line axis according to an example.

FIG. 1 is a perspective view illustrating an assembly system 100 to support components 110 of a workpiece 104 on a common hinge line axis according to an example. As illustrated, the assembly system 100 includes a jig fixture 102 to support the workpiece 104 and a tool 106 coupled to the jig fixture 102. For example, the tool 106 is coupled to the jig fixture 102 via a bracket 108.

As will be described in greater detail below, the tool 106 is utilized to assemble supported components 110 (e.g., hinge components) onto the workpiece 104.

Figure 2:
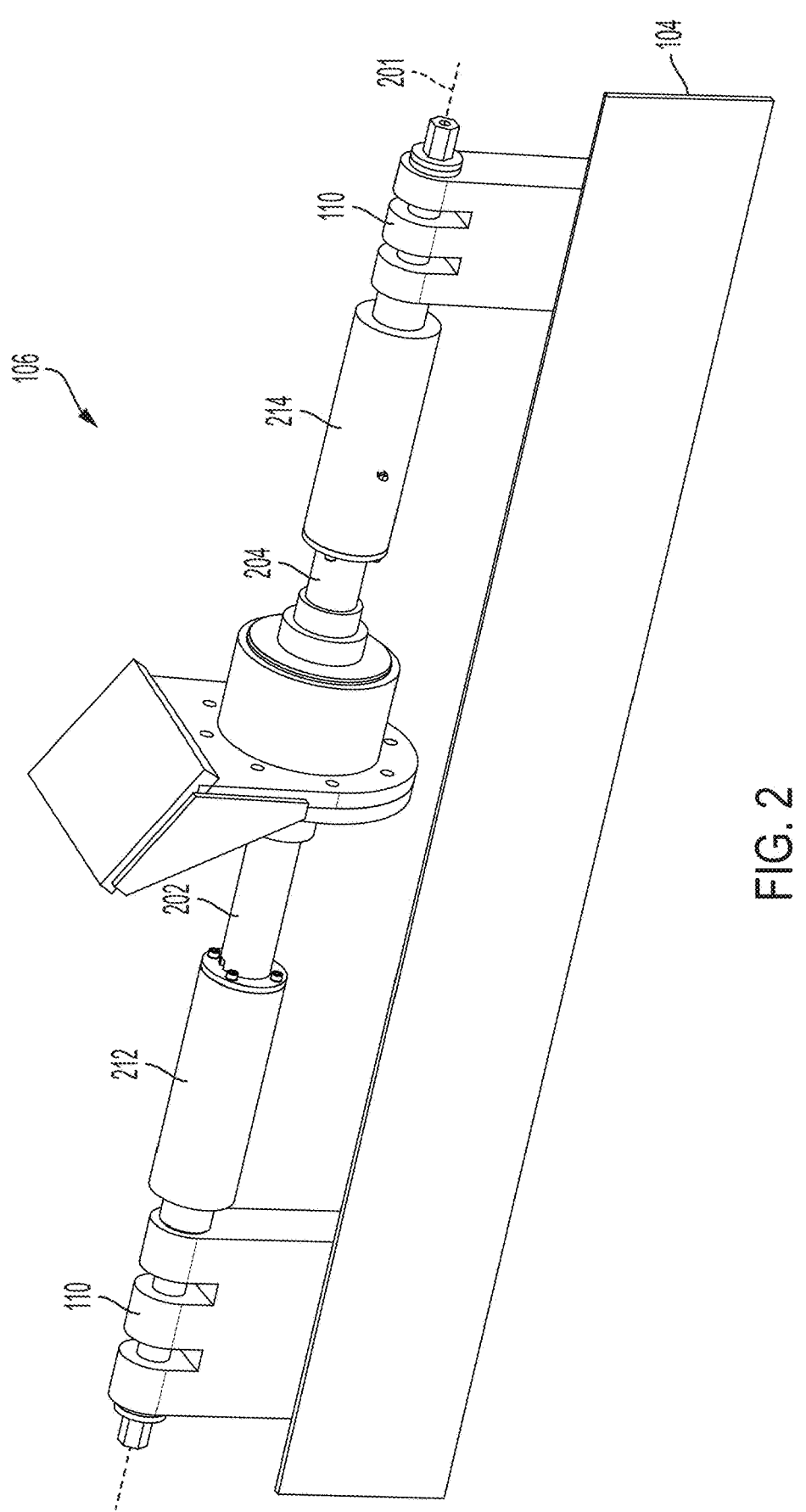
FIG. 2 is a perspective view illustrating a tool to support components of a workpiece on a common hinge line axis according to an example.

FIG. 2 is a perspective view illustrating the tool 106 to support components 110 of the workpiece 104 on a common hinge line axis 201 according to an example. As illustrated, the tool 106 includes a first pin 202 and a second pin 204 coupled in coaxial alignment with each other, defining the common hinge line axis 201.

A first shouldered hinge pin 212 is slidably disposed on a distal end of the first pin 202 and a second shouldered hinge pin 214 is slidably disposed on a distal end of the second pin 204. The first and second shouldered hinge pins 212/214 allow translation along the common hinge line axis 201 of the supported components 110 when coupled to the first and second shouldered hinge pins 212/214.

Figure 3:
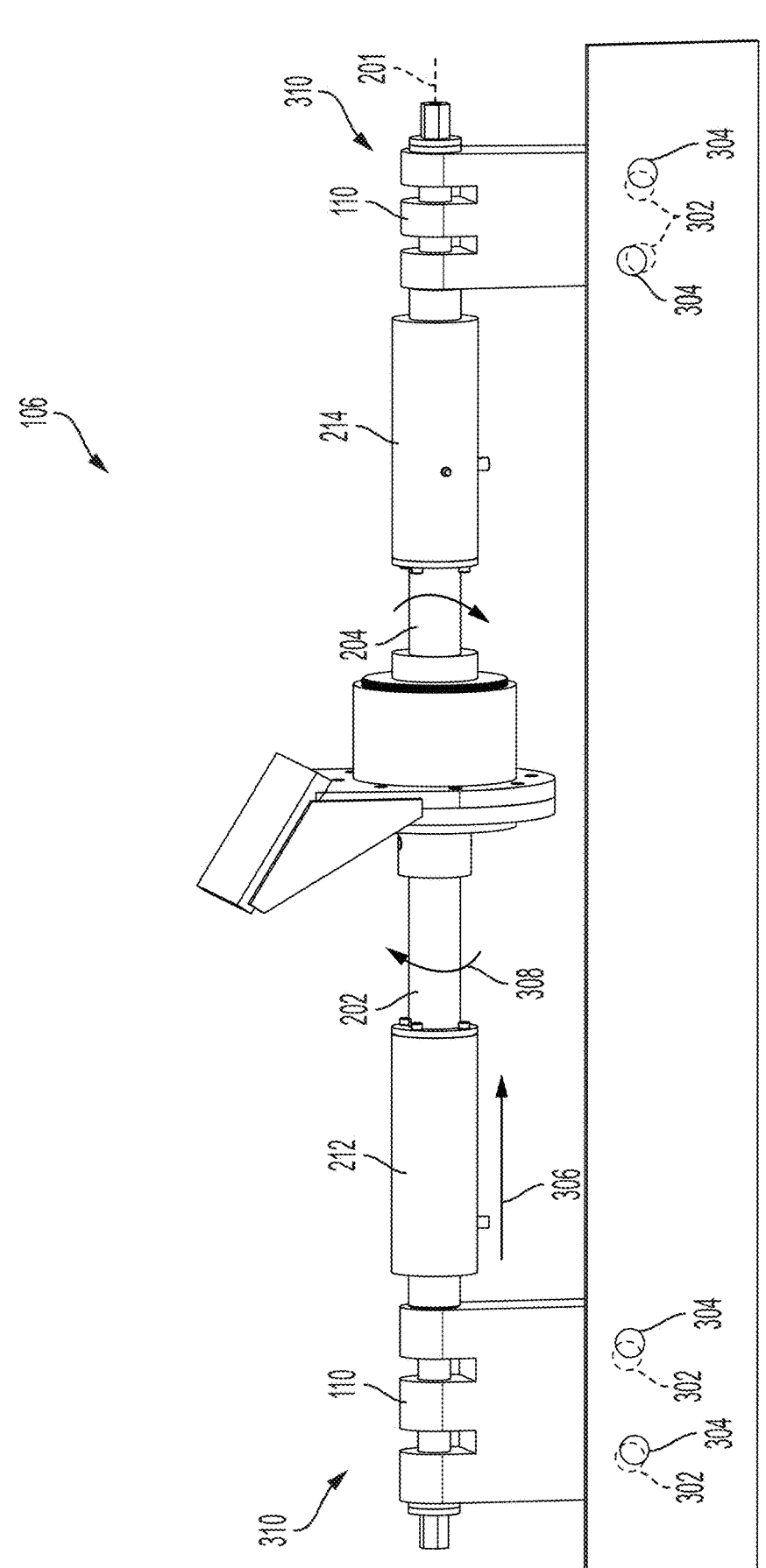
FIG. 3 is a side view illustrating a tool to support components of a workpiece on a common hinge line axis according to an example.

FIG. 3 is a side view illustrating the tool 106 to support components 110 of the workpiece 104 on the common hinge line axis 201 according to an example. As illustrated, minor alignment discrepancies are illustrated between intended ideal features 302 and slightly misaligned features 304 of the workpiece 104 (e.g., an aircraft structural element (such as a wing)) and brackets 310 having the supported component 110 (e.g., a hinged element). For example, it is desirable to enable translation 306 (left or right) of each bracket 310 as well as pivotal or angular adjustment 308 (e.g., via a ball joint) of the brackets 310 relative to the workpiece 104 (e.g., aircraft structure). Such translation 306 and/or pivotal or angular adjustment 308 may position the brackets 310 in alignment with slightly misaligned features 304 on the workpiece 104 while maintaining a common hinge-line of the brackets 310. Accordingly, the brackets 310 having the supported component 110 (e.g., a hinged element) are assembled to an aircraft structure and maintained along a common hinge line to inhibit binding of a pivotal component that is to be pivotally coupled to the brackets 310.

Figure 4:
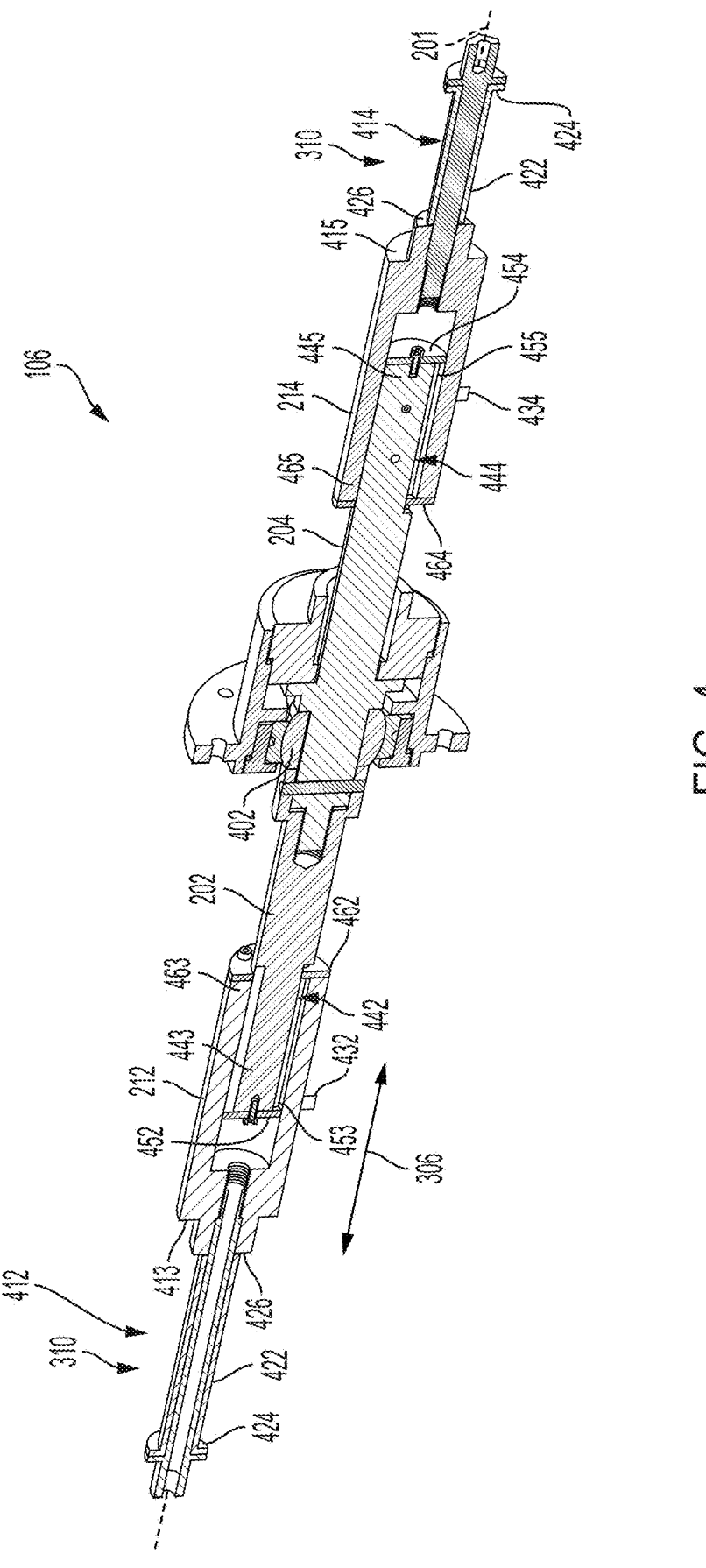
FIG. 4 is a cross-sectional perspective view illustrating a tool to support components of a workpiece on a common hinge line axis according to an example.

FIG. 4 is a cross-sectional perspective view illustrating the tool 106 to support components of the workpiece on the common hinge line axis 201 according to an example. As illustrated, the first and second pins 202/204 are disposed within a ball and socket joint 402. The ball and socket joint 402 enables pivotal adjustment of the common hinge line axis 201 while maintaining the first and second pins 202/204 co-axial to each other during adjustment of the common hinge line axis 201, to aid fit and assembly of the supported components to a mating structure.

In some implementations, the ball and socket joint 402 is a spherical bearing or the like.

In some examples, the tool 106 includes a first part support pin 412 coupled to a distal end 413 of the first shouldered hinge pin 212 and a second part support pin 414 coupled to a distal end 415 of the second shouldered hinge pin 214. As illustrated, the first part support pin 412 is coupled to the first shouldered hinge pin 212 and the second part support pin 414 is coupled to the second shouldered hinge pin 214 via threaded fittings, although other coupling methods may be utilized.

In the illustrated example, The first and second part support pins 412/414 each have a shaft 422 to be received through the supported components. The first and second part support pins 412/414 each have a part support shoulder 424 positioned opposite to a shouldered hinge pin shoulder 426 of the corresponding first and second shouldered hinge pins 212/214 to capture the supported components (e.g., to act as brackets 310).

In some implementations, the tool 106 includes a first retaining cross pin 432 coupled to the first shouldered hinge pin 212 and the first pin 202 and a second retaining cross pin 434 coupled to the second shouldered hinge pin 214 and the second pin 204. Each of the first and second retaining cross pins 432/434 are to establish a fixed nominal position of the first and second shouldered hinge pins 212/214 when fully inserted and are to allow movement of the first and second shouldered hinge pins 212/214 when removed from the first and second pins 202/204. Such an arrangement permits the first and second shouldered hinge pins 212/214 to be optionally locked in place or freed to enable translation 306 (left or right).

In some examples, the tool 106 includes a first groove 442 in a distal end 443 of the first pin 202 and a second groove 444 in a distal end 445 of the second pin 204.

In some implementations, a first end cap 452 is located at a distal end 453 of the first groove 442 and a second end cap 454 located at a distal end 455 of the second groove 444.

In some examples, a first retainer cap 462 is coupled to a proximal end 463 of the first shouldered hinge pin 212 and a second retainer cap 464 is coupled to a proximal end 465 of the second shouldered hinge pin 214. The first and second retainer caps 462/464 are respectively slidably coupled to the first and second grooves 442/444 to translate up to the first and second end caps 452/454, for example. Such an arrangement prevents the first and second shouldered hinge pins 212/214 from being disconnected from the first and second pins 202/204.

Figure 5:
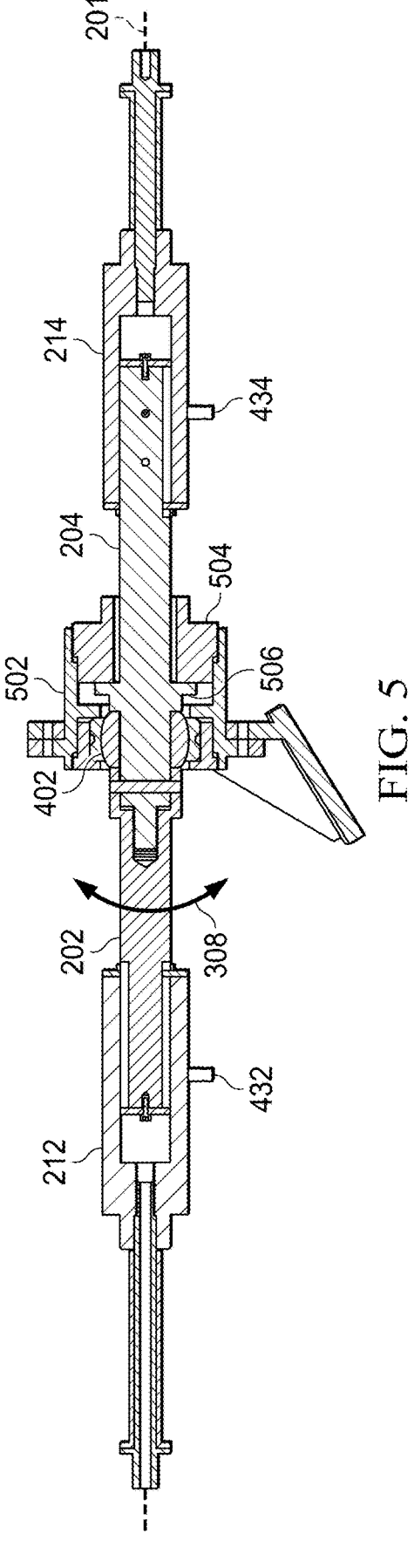
FIG. 5 is a cross-sectional side view illustrating a tool to support components of a workpiece on a common hinge line axis according to an example.

FIG. 5 is a cross-sectional side view illustrating the tool 106 to support components of the workpiece on the common hinge line axis 201 according to an example. As illustrated, a housing 502 contains the ball and socket joint 402. A retaining lock 504 is threadedly coupled to the housing 502. The retaining lock 504 engages a pin shoulder 506 on either the first pin 202 or the second pin 204 (e.g., as illustrated here by second pin 204), to lock and maintain a fixed nominal position of the tool 106 when the retaining lock 504 is tightened. Such an arrangement permits the first and second pin 202/204 to be optionally locked in place or freed to enable pivotal or angular adjustment 308 (e.g., via a ball joint 402).

As described above, accurate alignment and positioning of piece part features are important for DA to avoid the need for match drilling at the time of assembly. However, minor variations in alignment and positioning of piece part features may be particularly problematic when assembling hinge pieces having a common hinge line.

Accordingly, some implementations discussed herein may support Determinate Assembly (DA) when assembling hinge pieces having a common hinge line, which may allow parts to be fabricated complete with all features incorporated in the final designed condition. This in turn may allow assembly to occur without the performance of match-drilling operations on assembly, further eliminating significant labor cost and cycle time from assembly operations, reducing nonconformances, and eliminating a major source of workplace recordable injuries and lost work days. Implementations of the present disclosure have the potential to eliminate one or more temporary assembly operations, with a substantial cost savings.

More specifically, some implementations herein ensure alignment of axis critical components while allowing the components to be assembled to the allowed locational deviation within the mating substructure. Such implementations permit a combined axial adjustment to facilitate the components to mate with substructure, yet hold fixed the axis that is coaxial between the components. For example, such implementations allow for combined axial adjustment of the hinge line components while holding them coaxial and/or allow for span variation between components. Such operations provide the ability to retain the precision required of hinge lines, while allowing the hinge line to freely move to facilitate nominal DA build conditions. Accordingly, such implementations eliminate the need for boring tooling at the time of assembly, reduces touch labor, and ensures product compliance.

Figure 6:
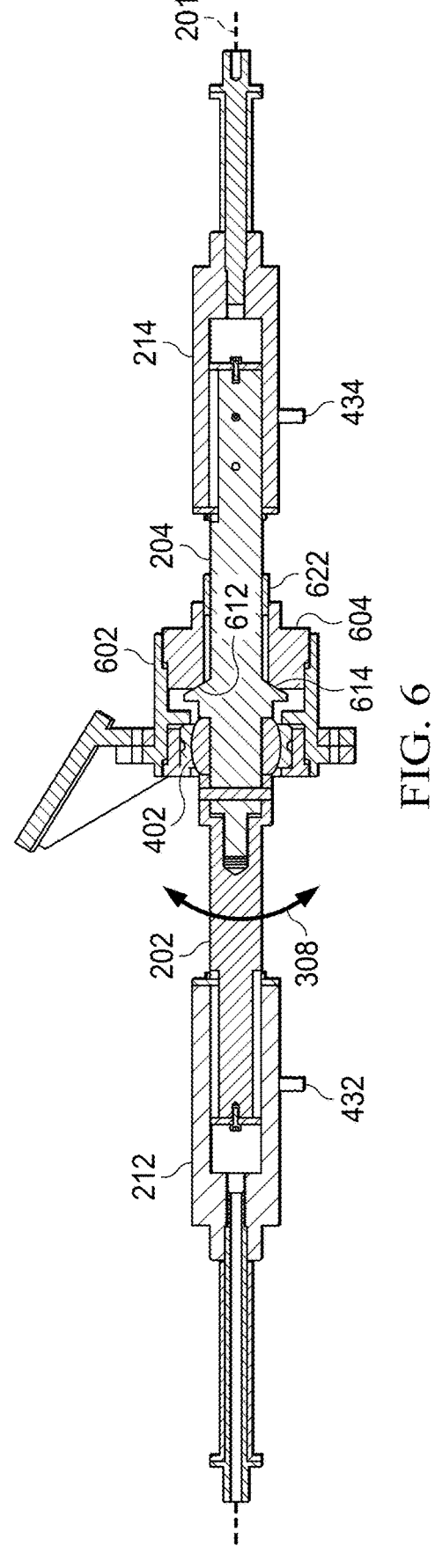
FIG. 6 is a cross-sectional side view illustrating another tool to support components of a workpiece on a common hinge line axis according to an example.

FIG. 6 is a cross-sectional side view illustrating another tool 106 to support components of the workpiece on the common hinge line axis 201 according to an example. As illustrated, the housing 602 containing the ball and socket joint 402. A retaining lock 604 is threadedly coupled to the housing 602. The retaining lock 604 includes a curved brake surface 612 that engages a spherical shaped pin shoulder 614 on either the first pin or the second pin 202/204 (e.g., illustrated here as second pin 204), to lock and maintain a pivotally adjusted position of the ball and socket joint 402 when the retaining lock 604 is tightened. Such an arrangement permits the first and second pin 202/204 to be optionally locked in place or freed to enable pivotal or angular adjustment 308 (e.g., via a ball joint 402).

In some implementations, a bushing 622 is slidably coupled to either the first pin or the second pin 202/204 (e.g., illustrated here as second pin 204). The bushing 622 is to be received within the retaining lock 604 to establish a fixed nominal position of the tool 106. For example, the bushing 622 will force the retaining lock 604 to the fixed nominal position of the tool 106 when inserted.

FIG. 7 is a flowchart of an example method 700 to support components on a common hinge line axis according to an example. The method 700 may generally be implemented in an apparatus, such as, for example, the assembly system 100 (FIG. 1) and/or the tool 106 (FIGS. 1-6), already discussed.

Illustrated processing block 702 provides for fastening the support components to a tool.

Illustrated processing block 704 provides for aligning the support components. For example, the support components may be aligned along the common hinge line axis via a first pin and a second pin of the tool coupled in coaxial alignment with each other.

Illustrated processing block 706 provides for translating the support components. For example, the support components may be translated in a first direction along the common hinge line axis via a first shouldered hinge pin slidably disposed on a distal end of the first pin and a second shouldered hinge pin slidably disposed on a distal end of the second pin.

Illustrated processing block 708 provides for pivotally adjusting the common hinge line axis. For example, the common hinge line axis may be pivotally adjusted while maintaining the first and second pins co-axial to each other during adjustment of the common hinge line axis via a ball and socket joint coupled to the first and second pins, to aid fit and assembly of the supported components to a mating structure.

Additional and/or alternative operations for method 700 are described below with regard to methods 800 and 900 (e.g., FIGS. 8 and 9, respectively).

FIG. 8 is a flowchart of another example method 800 to support components on a common hinge line axis according to an example. The method 800 may generally be implemented in an apparatus, such as, for example, the assembly system 100 (FIG. 1) and/or the tool 106 (FIGS. 1-6), already discussed.

Illustrated processing block 802 provides for locking and maintaining the ball and socket joint at a fixed nominal position of the tool. For example, the ball and socket joint may be locked and maintained at a fixed nominal position of the tool when a retaining lock coupled to either the first pin or the second pin is tightened.

FIG. 9 is a flowchart of a further method 900 to support components on a common hinge line axis according to an example. The method 900 may generally be implemented in an apparatus, such as, for example, the assembly system 100 (FIG. 1) and/or the tool 106 (FIGS. 1-6), already discussed.

Illustrated processing block 902 provides for locking and maintaining the ball and socket joint at a fixed nominal position of the tool. For example, the ball and socket joint may be locked and maintained at a fixed nominal position of the tool when a retaining lock coupled to either the first pin or the second pin is tightened.

Illustrated processing block 904 provides for locking and maintaining the ball and socket joint at the fixed nominal position of the tool when a bushing that is slidably coupled to either the first pin or the second pin is received within the retaining lock.

ADDITIONAL NOTES AND EXAMPLES

Clause 1 is a tool to support components on a common hinge line axis that includes a first pin and a second pin coupled in coaxial alignment with each other, defining the common hinge line axis. A first shouldered hinge pin is slidably disposed on a distal end of the first pin and a second shouldered hinge pin is slidably disposed on a distal end of the second pin. The first and second shouldered hinge pins allow translation along the common hinge line axis of the supported components when coupled to the first and second shouldered hinge pins. The first and second pins are disposed within a ball and socket joint. The ball and socket joint enables pivotal adjustment of the common hinge line axis while maintaining the first and second pins co-axial to each other during adjustment of the common hinge line axis, to aid fit and assembly of the supported components to a mating structure.

Clause 2 includes the tool of Clause 1, further including: a housing containing the ball and socket joint; and a retaining lock threadedly coupled to the housing, where the retaining lock engages a pin shoulder on either the first pin or the second pin, to lock and maintain a fixed nominal position of the tool when the retaining lock is tightened.

Clause 3 includes the tool of Clause 1, further including: a housing containing the ball and socket joint; and a retaining lock threadedly coupled to the housing, where the retaining lock includes a curved brake surface that engages a spherical shaped pin shoulder on either the first pin or the second pin, to lock and maintain a pivotally adjusted position of the ball and socket joint when the retaining lock is tightened.

Clause 4 includes the tool of Clause 3, further including: a bushing slidably coupled to either the first pin or the second pin, the bushing to be received within the retaining lock to establish a fixed nominal position of the tool.

Clause 5 includes the tool of any one of Clauses 1 to 4, where the ball and socket joint is a spherical bearing.

Clause 6 includes the tool of any one of Clauses 1 to 5, further including: a first part support pin coupled to a distal end of the first shouldered hinge pin and a second part support pin coupled to a distal end of the second shouldered hinge pin, where the first and second part support pins each have a shaft to be received through the supported components, and where the first and second part support pins each have a part support shoulder positioned opposite to a shouldered hinge pin shoulder of the corresponding first and second shouldered hinge pins to capture the supported components.

Clause 7 includes the tool of any one of Clauses 1 to 6, further including: a first retaining cross pin coupled to the first shouldered hinge pin and the first pin and a second retaining cross pin coupled to the second shouldered hinge pin and the second pin, each of the first and second retaining cross pins to establish a fixed nominal position of the first and second shouldered hinge pins when fully inserted and to allow movement of the first and second shouldered hinge pins when removed from the first and second pins.

Clause 8 includes the tool of any one of Clauses 1 to 7, further including: a first groove in a distal end of the first pin and a second groove in a distal end of the second pin; a first end cap located at a distal end of the first groove and a second end cap located at a distal end of the second groove; and a first retainer cap coupled to a proximal end of the first shouldered hinge pin and a second retainer cap coupled to a proximal end of the second shouldered hinge pin, where the first and second retainer caps are respectively slidably coupled to the first and second grooves to translate up to the first and second end caps.

Clause 9 is an assembly system to support components of a workpiece on a common hinge line axis that includes a jig fixture to support the workpiece and a tool coupled to the jig fixture. The tool includes a first pin and a second pin coupled in coaxial alignment with each other, defining the common hinge line axis. A first shouldered hinge pin is slidably disposed on a distal end of the first pin and a second shouldered hinge pin is slidably disposed on a distal end of the second pin. The first and second shouldered hinge pins allow translation along the common hinge line axis of the supported components when coupled to the first and second shouldered hinge pins. The first and second pins are disposed within a ball and socket joint. The ball and socket joint enables pivotal adjustment of the common hinge line axis while maintaining the first and second pins co-axial to each other during adjustment of the common hinge line axis, to aid fit and assembly of the supported components to a mating structure.

Clause 10 includes the assembly system of Clause 9, further including: a housing containing the ball and socket joint; a retaining lock threadedly coupled to the housing, where the retaining lock engages a pin shoulder on either the first pin or the second pin, to lock and maintain a fixed nominal position of the tool when the retaining lock is tightened.

Clause 11 includes the assembly system of Clause 9, further including: a housing containing the ball and socket joint; and a retaining lock threadedly coupled to the housing, where the retaining lock includes a curved brake surface that engages a spherical shaped pin shoulder on either the first pin or the second pin, to lock and maintain a pivotally adjusted position of the ball and socket joint when the retaining lock is tightened.

Clause 12 includes the assembly system of Clause 11, further including: a bushing slidably coupled to either the first pin or the second pin, the bushing to be received within the retaining lock to establish a fixed nominal position of the tool.

Clause 13 includes the assembly system of any one of Clauses 9 to 12, where the ball and socket joint is a spherical bearing.

Clause 14 includes the assembly system of any one of Clauses 9 to 13, further including: a first part support pin coupled to a distal end of the first shouldered hinge pin and a second part support pin coupled to a distal end of the second shouldered hinge pin, where the first and second part support pins each have a shaft to be received through the supported components, and where the first and second part support pins each have a part support shoulder positioned opposite to a shouldered hinge pin shoulder of the corresponding first and second shouldered hinge pins to capture the supported components.

Clause 15 includes the assembly system of any one of Clauses 9 to 14, further including: a first retaining cross pin coupled to the first shouldered hinge pin and the first pin and a second retaining cross pin coupled to the second shouldered hinge pin and the second pin, each of the first and second retaining cross pins to establish a fixed nominal position of the first and second shouldered hinge pins when fully inserted and to allow movement of the first and second shouldered hinge pins when removed from the first and second pins.

Clause 16 includes the assembly system of any one of Clauses 9 to 15, further including: a first groove in a distal end of the first pin and a second groove in a distal end of the second pin; a first end cap located at a distal end of the first groove and a second end cap located at a distal end of the second groove; and a first retainer cap coupled to a proximal end of the first shouldered hinge pin and a second retainer cap coupled to a proximal end of the second shouldered hinge pin, where the first and second retainer caps are respectively slidably coupled to the first and second grooves to translate up to the first and second end caps.

Clause 17 is a method to support components on a common hinge line axis that includes fastening the support components to a tool. The support components are aligned along the common hinge line axis via a first pin and a second pin of the tool coupled in coaxial alignment with each other. The support components are translated in a first direction along the common hinge line axis via a first shouldered hinge pin slidably disposed on a distal end of the first pin and a second shouldered hinge pin slidably disposed on a distal end of the second pin. The common hinge line axis is pivotally adjusted while maintaining the first and second pins co-axial to each other during adjustment of the common hinge line axis via a ball and socket joint coupled to the first and second pins, to aid fit and assembly of the supported components to a mating structure.

Clause 18 includes the method of Clause 17, further including: locking and maintaining the ball and socket joint at a fixed nominal position of the tool when a retaining lock coupled to either the first pin or the second pin is tightened.

Clause 19 includes the method of Clause 17, further including: locking and maintaining a pivotally adjusted position of the ball and socket joint at a fixed nominal position of the tool when a retaining lock coupled to either the first pin or the second pin is tightened.

Clause 20 includes the method of Clause 19, further including: locking and maintaining the ball and socket joint at a fixed nominal position of the tool when a bushing that is slidably coupled to either the first pin or the second pin is received within the retaining lock.

Clause 21 includes an apparatus including means for performing the function of any preceding Clause.

All definitions, as defined and used herein, should be understood to control over dictionary definitions, definitions in documents incorporated by reference, and/or ordinary meanings of the defined terms.

Furthermore, for ease of understanding, certain functional blocks can have been delineated as separate blocks; however, these separately delineated blocks should not necessarily be construed as being in the order in which they are discussed or otherwise presented herein. For example, some blocks can be able to be performed in an alternative ordering, simultaneously, etc.

The terms "coupled," "attached," or "connected" can be used herein to refer to any type of relationship, direct or indirect, between the components in question, and can apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples can be combined to form additional examples.

I claim:

1. A tool to support components on a common hinge line axis, comprising:
 a first pin and a second pin coupled in coaxial alignment with each other, defining the common hinge line axis; and
 a first shouldered hinge pin slidably disposed on a distal end of the first pin and a second shouldered hinge pin slidably disposed on a distal end of the second pin, wherein the first and second shouldered hinge pins allow translation along the common hinge line axis of the supported components when coupled to the first and second shouldered hinge pins,
 wherein the first and second pins are mechanically coupled to a ball and socket joint, wherein the ball and socket joint enables pivotal adjustment of the common hinge line axis while maintaining the first and second pins co-axial to each other during adjustment of the common hinge line axis, to aid fit and assembly of the supported components to a mating structure.

2. The tool of claim 1, further comprising:
 a housing containing the ball and socket joint; and
 a retaining lock threadedly coupled to the housing, wherein the retaining lock engages a pin shoulder on either the first pin or the second pin, to lock and maintain a fixed nominal position of the tool when the retaining lock is tightened.

3. The tool of claim 1, further comprising:
 a housing containing the ball and socket joint; and
 a retaining lock threadedly coupled to the housing, wherein the retaining lock includes a curved brake surface that engages a spherical shaped pin shoulder on either the first pin or the second pin, to lock and maintain a pivotally adjusted position of the ball and socket joint when the retaining lock is tightened.

4. The tool of claim 3, further comprising: a bushing slidably coupled to either the first pin or the second pin, the bushing to be received within the retaining lock to establish a fixed nominal position of the tool.

5. The tool of claim 1, wherein the ball and socket joint is a spherical bearing.

6. The tool of claim 1, further comprising: a first part support pin coupled to a distal end of the first shouldered hinge pin and a second part support pin coupled to a distal end of the second shouldered hinge pin, wherein the first and second part support pins each have a shaft to be received through the supported components, and wherein the first and second part support pins each have a part support shoulder positioned opposite to a shouldered hinge pin shoulder of the corresponding first and second shouldered hinge pins to capture the supported components.

7. The tool of claim 1, further comprising: a first retaining cross pin coupled to the first shouldered hinge pin and the first pin and a second retaining cross pin coupled to the second shouldered hinge pin and the second pin, each of the first and second retaining cross pins to establish a fixed nominal position of the first and second shouldered hinge pins when fully inserted and to allow movement of the first and second shouldered hinge pins when removed from the first and second pins.

8. The tool of claim 1, further comprising:
   a first groove in a distal end of the first pin and a second groove in a distal end of the second pin;
   a first end cap located at a distal end of the first groove and a second end cap located at a distal end of the second groove; and
   a first retainer cap coupled to a proximal end of the first shouldered hinge pin and a second retainer cap coupled to a proximal end of the second shouldered hinge pin, wherein the first and second retainer caps are respectively slidably coupled to the first and second grooves to translate up to the first and second end caps.

9. An assembly system to support components of a workpiece on a common hinge line axis, comprising:
   a jig fixture to support the workpiece; and
   a tool coupled to the jig fixture, the tool comprising:
      a first pin and a second pin coupled in coaxial alignment with each other, defining the common hinge line axis; and
      a first shouldered hinge pin slidably disposed on a distal end of the first pin and a second shouldered hinge pin slidably disposed on a distal end of the second pin, wherein the first and second shouldered hinge pins allow translation along the common hinge line axis of the supported components when coupled to the first and second shouldered hinge pins,
      wherein the first and second pins are mechanically coupled to a ball and socket joint, wherein the ball and socket joint enables pivotal adjustment of the common hinge line axis while maintaining the first and second pins co-axial to each other during adjustment of the common hinge line axis, to aid fit and assembly of the supported components to a mating structure.

10. The assembly system of claim 9, further comprising:
    a housing containing the ball and socket joint; and
    a retaining lock threadedly coupled to the housing, wherein the retaining lock engages a pin shoulder on either the first pin or the second pin, to lock and maintain a fixed nominal position of the tool when the retaining lock is tightened.

11. The assembly system of claim 9, further comprising:
    a housing containing the ball and socket joint; and
    a retaining lock threadedly coupled to the housing, wherein the retaining lock includes a curved brake surface that engages a spherical shaped pin shoulder on either the first pin or the second pin, to lock and maintain a pivotally adjusted position of the ball and socket joint when the retaining lock is tightened.

12. The assembly system of claim 11, further comprising: a bushing slidably coupled to either the first pin or the second pin, the bushing to be received within the retaining lock to establish a fixed nominal position of the tool.

13. The assembly system of claim 9, wherein the ball and socket joint is a spherical bearing.

14. The assembly system of claim 9, further comprising: a first part support pin coupled to a distal end of the first shouldered hinge pin and a second part support pin coupled to a distal end of the second shouldered hinge pin, wherein the first and second part support pins each have a shaft to be received through the supported components, and wherein the first and second part support pins each have a part support shoulder positioned opposite to a shouldered hinge pin shoulder of the corresponding first and second shouldered hinge pins to capture the supported components.

15. The assembly system of claim 9, further comprising: a first retaining cross pin coupled to the first shouldered hinge pin and the first pin and a second retaining cross pin coupled to the second shouldered hinge pin and the second pin, each of the first and second retaining cross pins to establish a fixed nominal position of the first and second shouldered hinge pins when fully inserted and to allow movement of the first and second shouldered hinge pins when removed from the first and second pins.

16. The assembly system of claim 9, further comprising:
    a first groove in a distal end of the first pin and a second groove in a distal end of the second pin;
    a first end cap located at a distal end of the first groove and a second end cap located at a distal end of the second groove; and
    a first retainer cap coupled to a proximal end of the first shouldered hinge pin and a second retainer cap coupled to a proximal end of the second shouldered hinge pin, wherein the first and second retainer caps are respectively slidably coupled to the first and second grooves to translate up to the first and second end caps.

* * * * *